United States Patent
Wang

(10) Patent No.: US 9,206,342 B2
(45) Date of Patent: Dec. 8, 2015

(54) PHOSPHONATE-CONTAINING POLYMER AND USE THEREOF AND PHOSPHONATE-CONTAINING POLYMER VISCOSITY REDUCER FOR DRILLING FLUID

(71) Applicants: CHINA PETROLEUM & CHEMICAL CORPORATION, Chaoyang District (CN); SINOPEC ZHONGYUAN OILFIELD SERVICE CORPORATION DRILLING ENGINEERING RESEARCH INSTITUTE, Puyang (CN)

(72) Inventor: Zhonghua Wang, Puyang (CN)

(73) Assignees: CHINA PETROLEUM & CHEMICAL CORPORATION, Beijing (CN); SINOPEC ZHONGYUAN OILFIELD SERVICE CORPORATION DRILLING ENGINEERING RESEARCH INSTITUTE, Puyang (CN)

( * ) Notice: Subject to any disclaimer, the term of this patent is extended or adjusted under 35 U.S.C. 154(b) by 161 days.

(21) Appl. No.: 14/031,191

(22) Filed: Sep. 19, 2013

(65) Prior Publication Data

US 2014/0080988 A1    Mar. 20, 2014

(30) Foreign Application Priority Data

Sep. 20, 2012 (CN) .......................... 2012 1 0353696
Jul. 5, 2013 (CN) .......................... 2013 1 0282648

(51) Int. Cl.
*C09K 8/035* (2006.01)
*C08F 220/58* (2006.01)
*C09K 8/24* (2006.01)
*C09K 8/508* (2006.01)

(52) U.S. Cl.
CPC .............. *C09K 8/035* (2013.01); *C08F 220/58* (2013.01); *C09K 8/24* (2013.01); *C09K 8/5083* (2013.01)

(58) Field of Classification Search
CPC ........ C08F 220/58; C09K 8/035; C09K 8/24; C09K 8/5083
USPC ....................................... 526/266
See application file for complete search history.

(56) References Cited

U.S. PATENT DOCUMENTS

2003/0208022 A1* 11/2003 Nakamura et al. ............ 526/333
2011/0046023 A1*  2/2011 Greyson et al. ................ 507/90

FOREIGN PATENT DOCUMENTS

| CN | 1313345 | * | 9/2001 | ............... C02F 1/56 |
| CN | 1313345 | A | 9/2001 | |
| CN | 101928366 | A | 12/2010 | |
| CN | 101967372 | A | 2/2011 | |
| CN | 102391436 | A | 3/2012 | |

* cited by examiner

*Primary Examiner* — Ling Choi
*Assistant Examiner* — Chun-Cheng Wang
(74) *Attorney, Agent, or Firm* — Buchanan Ingersoll & Rooney PC

(57) ABSTRACT

The present invention provides a phosphonate-containing polymer and use thereof and a phosphonate-containing polymer viscosity reducer for drilling fluid. The phosphonate-containing polymer comprises structural units expressed by formula (1), structural units expressed by formula (2), and structural units expressed by formula (3) and/or structural units expressed by formula (4), wherein, the ratio of the mole number of the structural units expressed by formula (1), mole number of the structural units expressed by formula (2), and total mole number of the structural units expressed by formula (3) and structural units expressed by formula (4) is 10-85:10-75:5-55. The phosphonate-containing polymer still has outstanding viscosity reducing effect after high-temperature aging when it is applied in brine drilling fluids and high-density drilling fluids.

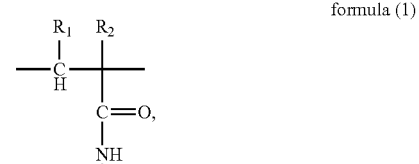

formula (1)

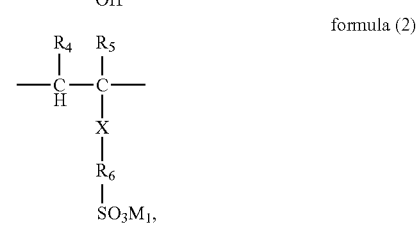

formula (2)

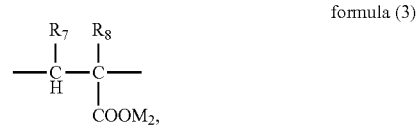

formula (3)

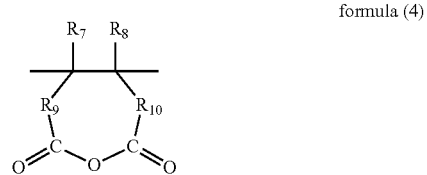

formula (4)

16 Claims, No Drawings

PHOSPHONATE-CONTAINING POLYMER AND USE THEREOF AND PHOSPHONATE-CONTAINING POLYMER VISCOSITY REDUCER FOR DRILLING FLUID

CROSS REFERENCE TO RELATED APPLICATIONS

This application claims the priority to Chinese Application No. 201210353696.7, filed on Sep. 20, 2012, entitled "Phosphonate-Containing Polymer Viscosity Reducer for Drilling Fluid and Preparation thereof", and claims the priority to Chinese Application No. 201310282648.8, filed on Jul. 5, 2013, entitled "Phosphonate-Containing Polymer and Use thereof and Phosphonate-Containing Polymer Viscosity Reducer for Drilling Fluid", which are specifically and entirely incorporated by reference.

FIELD OF THE INVENTION

The present invention relates to a phosphonate-containing polymer, the use of the phosphonate-containing polymer as a viscosity reducer for drilling fluid, and a phosphonate-containing polymer viscosity reducer for drilling fluid.

BACKGROUND OF THE INVENTION

In the drilling process in deep wells and ultra deep wells, clay and drill cuttings in the drilling fluid are dispersed at high temperature, since the drilling fluid is under high temperature condition for a long time; consequently, the drilling fluid is thickened at high temperature, resulting in increased viscosity and degraded rheological property of the drilling fluid. As oil and gas exploration evolves to deeper formations, the encountered formations are more and more complex, and the requirements for drilling fluid become higher and higher. In view of this problem, a series of research work has been done on high temperature viscosity reducers for drilling fluid in the countries around the world, centering on the requirements for well drilling in ultra deep wells. Those researches mainly focused on synthetic polymers (e.g., acrylic acid and vinylsulfonic acid, etc.) and organic phosphates, and these viscosity reducers have outstanding temperature tolerance performance. CN101928366A discloses a method for preparation of viscosity reducer for drilling fluid, comprising the following steps: dissolving a mixture of reactant monomers acrylic acid (AA) and 2-acrylamide-2-methyl propane sulfonic acid (AMPS) mixed at 0.5-10:1 mix ratio (mass ratio) in water, dissolving ammonium persulfate in amount equal to 0.5-5% total mass of the monomers in water, dissolving two molecular weight regulators in amount equal to 0.3-5% total mass of the monomers respectively in water and then loading into a reactor and heating up to 55-65° C., adding the solution of the reactant monomers and the solution of ammonium persulfate into the reactor, and then heating up to 85-95° C. and maintaining the reaction for 1 h, to obtain a viscosity reducer with 10-50% content of the monomers; neutralizing the system with sodium hydroxide to pH 7 after the reaction, and drying and crushing the product, to obtain a viscosity reducer for drilling fluid that can withstand 220° C. or higher temperature. However, the viscosity reducer for drilling fluid can't meet the requirements for actual application, since the viscosity reducing effect of polymers that contain carboxyl and sulfonic acid will be degraded in salt water drilling fluids and high-density drilling fluids, and organic phosphates have drawbacks such as short maintenance interval and narrow range of application, etc. Therefore, it is urgent task to develop a viscosity reducer for drilling fluid, which has good viscosity reducing effect after high temperature aging in salt water drilling fluids and high-density drilling fluids.

SUMMARY OF THE INVENTION

To overcome the drawback of degraded viscosity reducing effect of existing viscosity reducers for drilling fluid after high temperature aging in salt water drilling fluids and high-density drilling fluids, the present invention provides a phosphonate-containing polymer that still has good viscosity reducing effect after high temperature aging in salt water drilling fluids and high-density drilling fluids, use of the phosphonate-containing polymer as a viscosity reducer for drilling fluid, and a phosphonate-containing polymer viscosity reducer for drilling fluid.

The present invention provides a phosphonate-containing polymer, comprising structural units expressed by formula (1), structural units expressed by formula (2), and structural units expressed by formula (3) and/or structural units expressed by formula (4), wherein the ratio of the mole number of the structural units expressed by formula (1), mole number of the structural units expressed by formula (2), and total mole number of the structural units expressed by formula (3) and structural units expressed by formula (4) is 10-85:10-75:5-55;

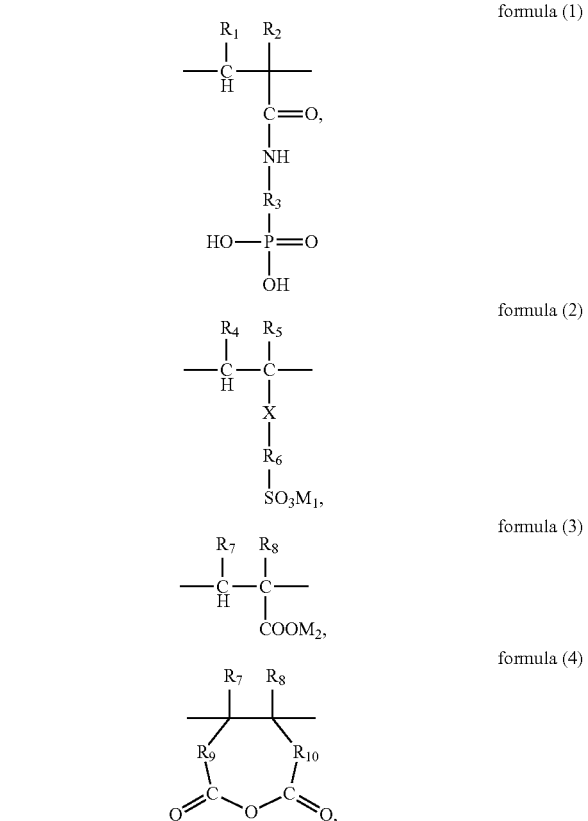

wherein, $R_1$, $R_2$, $R_4$ and $R_5$ are H or $C_1$-$C_5$ linear or branched alkyl respectively, $R_3$ is $C_1$-$C_5$ linear or branched alkylidene, X is a bond or

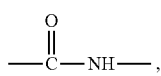

$R_6$ is a bond or $C_1$-$C_8$ linear or branched alkylene, $R_7$ is H, $C_1$-$C_5$ linear or branched alkyl or —COOM$_3$, $R_8$ is H, $C_1$-$C_5$ linear or branched alkyl or —RCOOM$_4$, R is $C_1$-$C_3$ linear or branched alkylidene, $M_1$-$M_4$ are H or an alkali metal element respectively, and $R_9$ and $R_{10}$ are a bond or $C_1$-$C_3$ linear or branched alkylidene respectively.

The present invention further provides a phosphonate-containing polymer viscosity reducer for drilling fluid prepared with the following method: homogeneously mixing an initiator, a monomer mixture, and molecular weight regulator in an aqueous solvent and controlling them to have polymerization reaction under olefinic solution polymerization reaction conditions, wherein the monomer mixture comprises a monomer A expressed by formula (5), a monomer B expressed by formula (6), and a monomer C expressed by formula (7) and/or a monomer D expressed by formula (8), and the ratio of the mole number of the monomer A, mole number of the monomer B, and total mole number of the monomer C and the monomer D is 10-85:10-75:5-55;

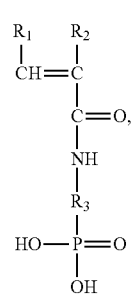

formula (5)

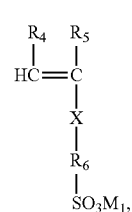

formula (6)

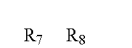

formula (7)

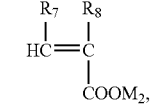

formula (8)

wherein, $R_1$, $R_2$, $R_4$ and $R_5$ are H or $C_1$-$C_5$ linear or branched alkyl respectively, $R_3$ is $C_1$-$C_5$ linear or branched alkylidene, X is a bond or

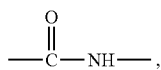

$R_6$ is a bond or $C_1$-$C_8$ linear or branched alkylene, $R_7$ is H, $C_1$-$C_5$ linear or branched alkyl or —COOM$_3$, $R_8$ is H, $C_1$-$C_5$ linear or branched alkyl or —RCOOM$_4$, R is $C_1$-$C_3$ linear or branched alkylidene, $M_1$-$M_4$ are H or an alkali metal element respectively, and $R_9$ and $R_{10}$ are a bond or $C_1$-$C_3$ linear or branched alkylidene respectively.

Moreover, the present invention provides a use of the phosphonate-containing polymer as a viscosity reducer for drilling fluid.

The present invention has the following beneficial effects: since the phosphonate-containing polymer contains phosphonate groups, —SO$_3$— groups, and —COO— groups, it still has outstanding viscosity reducing effect (i.e., good temperature tolerance and salt resistance performance) after high temperature aging in salt water drilling fluids and high-density drilling fluids. It can be seen from the results of the examples: the phosphonate-containing polymer achieves reduced filter loss equal to or less than 6.5 mL and viscosity reducing rate equal to or higher than 95.2% after aging for 16 h at 220° C. in calcium bentonite base mud; and achieves reduced filter loss equal to or less than 8.2 mL and viscosity reducing rate equal to or higher than 88.2% after aging for 16 h at 220° C. in high-density base mud; and achieves reduced filter loss equal to or less than 51 mL and viscosity reducing rate equal to or higher than 73.0% after aging for 16 h at 220° C. in compound brine base mud.

DETAILED DESCRIPTION OF THE EMBODIMENTS

Hereunder the embodiments of the present invention will be detailed. It should be appreciated that the embodiments described here are only provided to describe and explain the present invention, but shall not be deemed as constituting any limitation to the present invention.

The phosphonate-containing polymer provided in the present invention comprises structural units expressed by formula (1), structural units expressed by formula (2), and structural units expressed by formula (3) and/or structural units expressed by formula (4), wherein the ratio of the mole number of the structural units expressed by formula (1), mole number of the structural units expressed by formula (2), and total mole number of the structural units expressed by formula (3) and structural units expressed by formula (4) is 10-85:10-75:5-55;

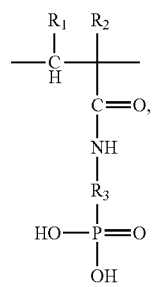

formula (1)

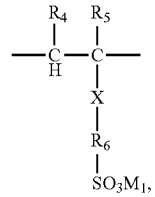

formula (2)

formula (3)

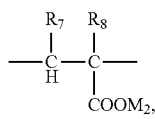

formula (4)

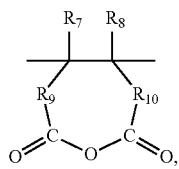

wherein, $R_1$, $R_2$, $R_4$ and $R_5$ are H or $C_1$-$C_5$ linear or branched alkyl respectively, $R_3$ is $C_1$-$C_5$ linear or branched alkylidene, X is a bond or

$R_6$ is a bond or $C_1$-$C_8$ linear or branched alkylene, $R_7$ is H, $C_1$-$C_5$ linear or branched alkyl or —COOM$_3$, $R_8$ is H, $C_1$-$C_5$ linear or branched alkyl or —RCOOM$_4$, R is $C_1$-$C_3$ linear or branched alkylidene, $M_1$-$M_4$ are H or an alkali metal element respectively, and $R_9$ and $R_{10}$ are a bond or $C_1$-$C_3$ linear or branched alkylidene respectively.

Wherein, the instances of the $C_1$-$C_5$ linear or branched alkyl include, but not limited to methyl, ethyl, n-propyl, iso-propyl, n-butyl, sec-butyl, isobutyl, tertiary butyl, n-pentyl, isopentyl, tertiary pentyl, and neopentyl. The instances of the $C_1$-$C_5$ linear or branched alkylidene include, but not limited to methylene, ethylidene, n-propylidene, iso-propylidene, n-butylidene, iso-butylidene, n-pentylidene, and iso-pentylidene. The instances of the $C_1$-$C_8$ linear or branched alkylene include, but not limited to methylene, ethylidene, n-propylidene, iso-propylidene, n-butylidene, iso-butylidene, n-pentylidene, iso-pentylidene, and phenylene. The instances of the $C_1$-$C_3$ linear or branched alkylidene include, but not limited to methylene, ethylidene, n-propylidene, and iso-propylidene.

The alkali metal element can be one or more selected from the group consisting of Li, Na, and K. Preferably, the $M_1$-$M_4$ are H, K, or Na respectively. The $M_1$-$M_4$ can be the same or different among different structural units of the same polymer.

Particularly preferably, in formula (1), $R_1$ and $R_2$ are H, and $R_3$ is

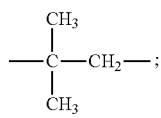

in that case, the monomer corresponding to the structural unit is 2-acrylamide-2-methyl propanephosphoric acid (abbreviated as AMPP).

Particularly preferably, in formula (2), $R_4$ and $R_5$ are H, X is

$R_6$ is

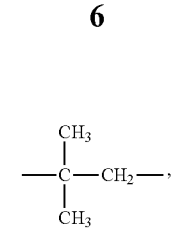

and $M_1$ is H, and, in that case, the monomer corresponding to the structural unit is 2-acrylamide-2-methyl propane sulfonic acid (abbreviated as AMPS); or, $R_4$ and $R_5$ are H, X and $R_6$ are a bond, and $M_1$ is Na, and, in that case, the monomer corresponding to the structural unit is sodium vinyl sulfonate (abbreviated as VSA); or, $R_4$ and $R_5$ are H, X is a bond, $R_6$ is

and $M_1$ is Na, and, in that case, the monomer corresponding to the structural unit is sodium p-styrene sulfonate (abbreviated as SSA); or, $R_4$ and $R_5$ are H, X is a bond, $R_6$ is methylene, and $M_1$ is Na, and, in that case, the monomer corresponding to the structural unit is sodium allyl sulfonate (abbreviated as ASA).

Particularly preferably, in formula (3), $R_7$ is H, $R_8$ is H, and $M_2$ is H, and, in that case, the monomer corresponding to the structural unit is acrylic acid (abbreviated as AA); or, $R_7$ is H, $R_8$ is methyl, and $M_2$ is H, and, in that case, the monomer corresponding to the structural unit is methacrylic acid (abbreviated as MAA); or, $R_7$ is —COOH, $R_8$ is H, and $M_2$ is H, and, in that case, the monomer corresponding to the structural unit is maleic acid; or, $R_7$ is H, $R_8$ is —CH$_2$COOH, and $M_2$ is H, and, in that case, the monomer corresponding to the structural unit is itaconic acid (abbreviated as IA).

Particularly preferably, in formula (4), $R_7$ is H, $R_8$ is H, and $R_9$ and $R_{10}$ are a bond, and, in that case, the monomer corresponding to the structural unit is maleic anhydride (abbreviated as MA).

In the present invention, there is no specific restriction to the number-average molecular weight of the phosphonate-containing polymer; for example, the number-average molecular weight can be 1,500-8,000, preferably 3,000-6,000.

The phosphonate-containing polymer viscosity reducer for drilling fluid provided in the present invention is prepared with the following method: homogeneously mixing an initiator, a monomer mixture, and molecular weight regulator in an aqueous solvent and controlling them to have polymerization reaction under olefinic solution polymerization reaction conditions, wherein the monomer mixture comprises a monomer A expressed by formula (5), a monomer B expressed by formula (6), and a monomer C expressed by formula (7) and/or a monomer D expressed by formula (8), and the ratio of the mole number of the monomer A, mole number of the monomer B, and total mole number of the monomer C and monomer D is 10-85:10-75:5-55;

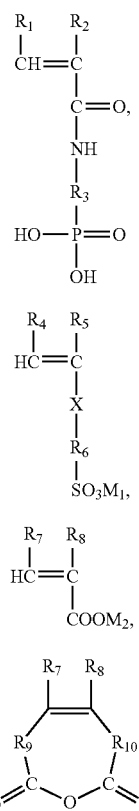

formula (5)

formula (6)

formula (7)

formula (8)

wherein, $R_1$, $R_2$, $R_4$ and $R_5$ are H or $C_1$-$C_5$ linear or branched alkyl respectively, $R_3$ is $C_1$-$C_5$ linear or branched alkylidene, X is a bond or $$-\overset{O}{\underset{\|}{C}}-NH-,$$

$R_6$ is a bond or $C_1$-$C_8$ linear or branched alkylene, $R_7$ is H, $C_1$-$C_5$ linear or branched alkyl or —$COOM_3$, $R_8$ is H, $C_1$-$C_5$ linear or branched alkyl or —$RCOOM_4$, R is $C_1$-$C_3$ linear or branched alkylidene, $M_1$-$M_4$ are H or an alkali metal element respectively, and $R_9$ and $R_{10}$ are a bond or $C_1$-$C_3$ linear or branched alkylidene respectively.

Through in-depth study, the inventor has found: the phosphate-containing monomer expressed by formula (9) and the phosphonate-containing monomer expressed by formula (5) in the present invention behave quite differently. It can be seen from the comparison between Example 1 and comparative Example 2: when the phosphate-containing monomer expressed by formula (9) is applied in the present invention, the polymer obtained from copolymerization reaction with the phosphate-containing monomer expressed by formula (9), the monomer B and monomer C achieves 9.5 mL reduced filter loss and 87.5% viscosity reducing rate after aging for 16 h at 220° C. in calcium bentonite base mud; achieves 9.5 mL reduced filter loss and 82.0% viscosity reducing rate after aging for 16 h at 220° C. in high-density drilling fluids; and achieves 59.2 mL reduced filter loss and 63.5% viscosity reducing rate after aging for 16 h at 220° C. in compound brine base mud. In contrast, the polymer obtained from copolymerization among the phosphonate-containing monomer expressed by formula (5) in the present invention, monomer B, and monomer C achieves 5.3 mL reduced filter loss and 95.2% viscosity reducing rate after aging for 16 h at 220° C. in calcium bentonite base mud; achieves 7.5 mL reduced filter loss and 90.2% viscosity reducing rate after aging for 16 h at 220° C. in high-density drilling fluids; achieves 50 mL reduced filter loss and 75.2% viscosity reducing rate after aging for 16 h at 220° C. in compound brine base mud.

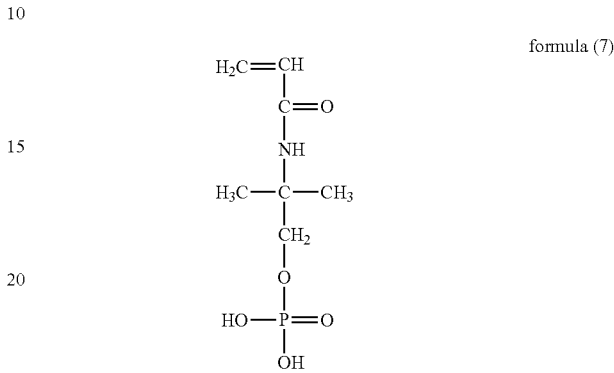

formula (7)

The instances of the $C_1$-$C_5$ linear or branched alkyl, $C_1$-$C_5$ linear or branched alkylidene, $C_1$-$C_8$ linear or branched alkylene, $C_1$-$C_3$ linear or branched alkylidene, and alkali metal element have been described above, and will not be detailed any more here.

Particularly preferably, the monomer A is 2-acrylamide-2-methyl propanephosphoric acid.

Particularly preferably, the monomer B is one or more selected from the group consisting of 2-acrylamide-2-methyl propane sulfonic acid, sodium vinyl sulfonate, sodium p-styrene sulfonate, and sodium allyl sulfonate.

Particularly preferably, the monomer C is one or more selected from the group consisting of acrylic acid, methacrylic acid, maleic acid, and itaconic acid.

Particularly preferably, the monomer D is maleic anhydride.

In the present invention, there is no specific restriction to the type and dosage of the initiator, as long as the initiator can initiate the polymerization reaction of the monomer mixture; for example, the initiator can be one or more selected from the group consisting of azo initiators, peroxide initiators, and redox initiators, preferably is a peroxide initiator, particularly preferably is ammonium persulfate and/or potassium persulfate. On the basis of the total weight of the monomer mixture, the dosage of the initiator can be 1-8 wt. %.

In the present invention, there is no specific restriction to the type and dosage of the molecular weight regulator; for example, the molecular weight regulator can be thioglycollic acid (abbreviated as TGA) and/or isopropyl alcohol (abbreviated as IPA). On the basis of the total weight of the monomer mixture, the dosage of the molecular weight regulator can be 0.1-4 wt. %.

In the present invention, the aqueous solvent can be any existing solvent with water that can be used as a reaction medium; for example, it can be water or mixture of water and any other solvent, preferably is water. On the basis of 100 parts by weight of the monomer mixture, the dosage of water can be 100-500 parts by weight.

In the present invention, there is no specific restriction to the method for homogeneously mixing the initiator, monomer mixture, and molecular weight regulators in the aqueous solvent; for example, the above-mentioned substances can be added into the aqueous solvent together and agitated to homogeneous state; particularly preferably, the monomer mixture is prepared into 10-40 wt. % water solution of the monomer mixture, the initiator is prepared into 5-15 wt. % water solution of the initiator, the molecular weight regulator is dissolved in water and then heated up to 50-80° C. temperature, and then the water solution of the initiator and water solution of the monomer mixture are added into the prepared water solution of the molecular weight regulator at a rate that ensures the temperature of the reaction system doesn't exceed 80° C. In actual operation, to prevent the temperature of the reaction system from exceeding 80° C., usually the water solution of the initiator and water solution of the monomer mixture are added in batches. For example, they can be added in 6-8 batches; in addition, the volume of the water solution of the initiator and the volume of the water solution of the monomer mixture can be equal or different among the batches, depending on the actual situation.

In addition, as described above, during the olefinic polymerization reaction, on the basis of 100 parts by weight of the monomer mixture, the dosage of water can be 100-500 parts by weight. Wherein, the dosage of water here includes the volume of water in the water solution of the monomer mixture, volume of water in the water solution of the initiator, and volume of water used to dissolve the molecular weight regulator.

In the present invention, there is no specific restriction to the polymerization reaction conditions, as long as the monomer mixture can be polymerized under the conditions; preferably, the polymerization reaction conditions ensure the number-average molecular weight of the obtained phosphonate-containing polymer is 1,500-8,000; more preferably, the polymerization reaction conditions ensure the number-average molecular weight of the phosphonate-containing polymer is 3,000-6,000. Specifically, to further facilitate the polymerization reaction of the monomer mixture, the polymerization reaction conditions preferably include: reaction temperature is 85-100° C., and reaction time is 1-10 h.

In the present invention, preferably, the method for preparation of the phosphonate-containing polymer viscosity reducer for drilling fluid further comprises: adjusting the pH of the reaction product to 7.5-9 after the polymerization reaction is completed, and then drying and crushing the product after the pH is adjusted. Wherein, the method for adjusting the pH of the mixture to 7.5-9 is well known to those skilled in the art; for example, an alkaline substance can be added into the reaction product. The alkaline substance can be a common choice in the art; for example, it can be selected from one or more selected from the group consisting of sodium hydroxide, potassium hydroxide, sodium carbonate, potassium carbonate, sodium bicarbonate, and potassium bicarbonate. The alkaline substance can be used in a form of solid or water solution. If the alkaline substance is used in the form of water solution, the concentration can be 10 wt. % to saturated concentration.

Moreover, the present invention provides an use of the phosphonate-containing polymer as a viscosity reducer for drilling fluid.

Other characteristics and advantages of the present invention will be further detailed in the embodiments hereunder.

Among the following examples and comparative examples: The number-average molecular weight Mn of polymer is measured with a Waters 1525/2414 gel permeation chromatograph (GPC) from Waters (a USA company), wherein, 0.100 mol/L phosphate buffer is used as the mobile phase, narrow-distribution sodium polyacrylate is used as the standard sample, and the test temperature is 25° C.; the contents of structural units in the polymer are calculated on the basis of the dosages of the monomers.

Among the following test examples and comparative test examples: the barite is purchased from Guizhou Kali Longteng Mining Co., Ltd., and has 4.32 g/cm$^3$ density; the sulfonated lignite is purchased from Oilfield Chemical Co., Ltd. of Dagang Oilfield and has a trade name as SMC, and is an industrial product; the P(AMPS-DMAM) tackifier is produced by Drilling Engineering Technology Research Institute of Zhongyuan Oilfield, and has 2.5×10$^6$ viscosity average molecular weight, wherein, on the basis of the total weight of the tackifier, the content of AMPS is 70 wt. %, and the content of DMAM is 30 wt. %; the calcium bentonite is purchased from Weifang Haoda Bentonite Co., Ltd. and is an industrial product.

Example 1

Mix 2-acrylamide-2-methyl propane phosphoric acid (AMPP), 2-acrylamide-2-methyl propane sulfonic acid (AMPS), and acrylic acid (AA) at 85%:10%:5% molar ratio and then dissolve the mixture in water to prepare 35% (mass percent) water solution of the monomer mixture, prepare ammonium persulfate in amount equal to 3% total mass of the monomer mixture into 10% (mass percent) water solution; dissolve thioglycollic acid (TGA) in amount equal to 1.5% total mass of the monomer mixture in water (the amount of water for dissolving the thioglycollic acid is twice of the total mass of the monomer mixture), and then load the solution into a reactor and heat up to 65° C.; add the water solution of the monomer mixture and water solution of ammonium persulfate into the reactor in 7 batches evenly at a rate that ensures the temperature in the reactor doesn't exceed 80° C.; heat up the system to 85° C. and maintain the reaction for 5 h after the water solution of the monomer mixture and water solution of ammonium persulfate are added; adjust the pH of the reaction system to 8 with sodium hydroxide after the reaction, to obtain a viscous product; then, dry and crush the product to obtain a viscosity reducer for drilling fluid. The number-average molecular weight Mn of the viscosity reducer for drilling fluid is 2,019.

Examples 2-9

Prepare phosphonate-containing polymer and phosphonate-containing polymer viscosity reducer for drilling fluid with the method described in Example 1, with the following difference: the reactants, reaction conditions, and number-average molecular weight Mn of the obtained viscosity reducer for drilling fluid are those shown in Table 1:

TABLE 1

| No. | Molar ratio of monomers | Initiator and dosage | Molecular weight regulator and dosage | Initial temperature/° C. | Reaction temperature/° C. | Reaction time/h | Mn |
|---|---|---|---|---|---|---|---|
| Example 2 | n(AMPP):n(AMPS):n(AA) = 60%:30%:10% | Ammonium persulfate, 3.5% | IPA, 4% | 60 | 100 | 1 | 2010 |

TABLE 1-continued

| No. | Molar ratio of monomers | Initiator and dosage | Molecular weight regulator and dosage | Initial temperature/ °C. | Reaction temperature/ °C. | Reaction time/h | Mn |
|---|---|---|---|---|---|---|---|
| Example 3 | n(AMPP):n(AMPS):n(AA) = 10%:75%:15% | Potassium persulfate, 1.0% | TGA, 2% | 65 | 95 | 10 | 8101 |
| Example 4 | n(AMPP):n(AMPS):n(AA) = 30%:15%:55% | Potassium persulfate, 4.5% | TGA, 1.5% | 50 | 90 | 5 | 6355 |
| Example 5 | n(AMPP):n(VSA):n(AA) = 50%:20%:30% | Ammonium persulfate, 7.0% | IPA, 3% | 65 | 95 | 6 | 3145 |
| Example 6 | n(AMPP):n(ASA):n(MA) = 85%:10%:5% | Potassium persulfate, 6.0% | TGA, 0.5% | 70 | 95 | 6 | 1980 |
| Example 7 | n(AMPP):n(SSA):n(AA) = 55%:20%:25% | Ammonium persulfate, 8.0% | TGA, 0.1% | 75 | 95 | 7 | 4120 |
| Example 8 | n(AMPP):n(AMPS):n(MAA) = 50%:30%:20% | Ammonium persulfate, 5.0% | TGA, 2.5% | 80 | 100 | 2 | 4100 |
| Example 9 | n(AMPP):n(AMPS):n(IA) = 50%:35%:15% | Potassium persulfate, 4.5% | TGA, 2% | 60 | 95 | 8 | 3927 |

Note:
In Table 1, the dosage of initiator and dosage of molecular weight regulator refer to the percentage of total mass of the monomer, respectively; for example, in Example 2, "ammonium persulfate, 3.5%" refers to that the initiator is ammonium persulfate and the dosage of ammonium persulfate is 3.5% total mass of the monomer; "IPA, 4%" refers to that the molecular weight regulator is IPA and the dosage of IPA is 4% total mass of the monomer.

Comparative Example 1

Mix 2-acrylamide-2-methyl propane sulfonic acid (AMPS) monomer and acrylic acid (AA) monomer at 85%:15% molar ratio and then dissolve the mixture in water to prepare 35% (mass percent) water solution of the monomer mixture, prepare potassium persulfate initiator in amount equal to 3% total mass of the monomer mixture into 10% (mass percent) water solution; dissolve thioglycollic acid (TGA) molecular weight regulator in amount equal to 1.5% total mass of the monomer mixture in water (the amount of water for dissolving the thioglycollic acid is twice of the total mass of the monomer mixture), and then load the solution into a reactor and heat up to 65° C.; add the water solution of the monomer mixture and water solution of the initiator into the reactor in 7 batches evenly at a rate that ensures the temperature in the reactor doesn't exceed 80° C.; heat up the system to 90° C. and maintain the reaction for 8 h after the water solution of the monomer mixture and water solution of the initiator are added; neutralize the pH of the reaction system to 8 with sodium hydroxide after the reaction, to obtain a viscous product; then, dry and crush the product to obtain a reference viscosity reducer for drilling fluid. The number-average molecular weight Mn of the reference viscosity reducer for drilling fluid is 8,201.

Comparative Example 2

Prepare a polymeric viscosity reducer for drilling fluid with the method described in Example 1, with the following difference: replace the 2-acrylamide-2-methyl propanephosphoric acid (AMPP) with a phosphate-containing monomer that is in the same amount and expressed by formula (9), to obtain a reference viscosity reducer for drilling fluid. The number-average molecular weight of the reference viscosity reducer for drilling fluid is 2,325.

Test Examples 1-9

The test examples 1-9 are provided here to describe the evaluation of the viscosity reducing effect and filter loss reducing effect of the phosphonate-containing polymer and phosphonate-containing polymer viscosity reducer for drilling fluid provided in the present invention. The base mud and testing method used in the evaluation are as follows:

(1) Preparation of Base Mud:

A. Calcium bentonite base mud: add 100 g calcium bentonite and 5 g anhydrous $Na_2CO_3$ into 1,000 mL water, agitate at a high speed (at 10,000 rpm agitation speed, the same below) for 20 min., and then maintain for 24 h at 25° C., to obtain a calcium bentonite base mud.

B. High-density base mud: add 30 g calcium bentonite and 5 g anhydrous $Na_2CO_3$ into 1,000 mL water, agitate at a high speed for 20 min, and maintain for 24 h at 25° C.; then, add 3 g P(AMPS-DMAM) tackifier and 15 g sulfonated lignite (SMC) filtrate reducer and agitate at a high speed for 20 min, weight up with barite to 1.8 $g/cm^3$, to obtain a high density base mud.

C. Compound brine base mud: add 40 g NaCl, 5 g $CaCl_2$, and 3 g anhydrous $Na_2CO_3$ into 1,000 mL 10% (volume fraction) bentonite base mud, agitate at a high speed for 20 min, and weight up with barite to 1.4 $g/cm^3$ density, to obtain a compound brine base mud.

(2) Test of Drilling Fluid Filter Loss and Viscosity Reducing Rate:

Add the viscosity reducer for drilling fluid into the three types of base mud respectively, agitate at a high speed for 5 min, carry out roll aging for 16 h at 220° C., and then agitate at a high speed for 5 min at 25° C.; measure the rheological parameter of the drilling fluid with a ZNN-D6 six-speed rotary viscosimeter, and measure the filter loss of the drilling fluid with a ZNS drilling fluid water loss meter. Calculate the viscosity reducing rate D of the base mud on the basis of the base mud with the following expression. The higher the viscosity reducing rate is, the higher the viscosity reducing performance of the viscosity reducer for drilling fluid is.

$$D = \frac{(\Phi_{100})_0 - \Phi_{100}}{(\Phi_{100})_0} \times 100\%$$

Where, $(\Phi 100)_0$ is the reading of base mud on the rotary viscosimeter at 100 rpm rotation speed;

$\Phi 100$ is the reading of base mud on the rotary viscosimeter at 100 rpm rotation speed after the viscosity reducer for drilling fluid is added into the base mud and aged for 16 h at 220° C. The dosages of the viscosity reducers for drilling fluid and the results are shown in Table 2.

Comparative Test Examples 1-2

The Comparative Test Examples 1-2 are provided here to describe the evaluation of the viscosity reducing effect and filter loss reducing effect of the reference viscosity reducers for drilling fluid.

Test the filter loss reducing effect and viscosity reducing effect of the polymeric viscosity reducers for drilling fluid obtained in the Comparative Examples 1-2 with the method used in the Test Examples 1-9. The results are shown in Table 2.

TABLE 2

| Base mud and dosage of filtrate reducer for drilling fluid | Properties of drilling fluid | Base mud | Example 1 | 2 | 3 | 4 | 5 | 6 | 7 | 8 | 9 | Comparative Example 1 | 2 |
|---|---|---|---|---|---|---|---|---|---|---|---|---|---|
| Calcium bentonite base mud, 0.5 wt. % | Filter loss/mL | 9.5 | 5.3 | 6 | 6.2 | 6.5 | 5.5 | 6 | 6.1 | 5.8 | 6.0 | 8.1 | 9.5 |
| | Viscosity reducing rate/% | — | 95.2 | 97.1 | 97.5 | 96.7 | 96.8 | 97.0 | 97.2 | 95.5 | 96.6 | 86.2 | 87.5 |
| High-density base mud, 1.0 wt. % | Filter loss/mL | 12 | 7.5 | 8.0 | 7.4 | 7.6 | 7.8 | 8.2 | 8.1 | 7.5 | 8.2 | 9.8 | 9.5 |
| | Viscosity reducing rate/% | — | 90.2 | 88.5 | 87.9 | 91.0 | 88.5 | 89.0 | 88.2 | 90.0 | 88.4 | 75.5 | 82.0 |
| Compound brine base mud, 1.0 wt. % | Filter loss/mL | 87 | 50 | 43 | 51 | 48.5 | 49.2 | 51 | 50.5 | 51 | 50.6 | 73.8 | 59.2 |
| | Viscosity reducing rate/% | — | 75.2 | 77.0 | 74.9 | 75.0 | 76.0 | 73.0 | 75.5 | 74.8 | 73.0 | 49.1 | 63.5 |

It can be seen from above results: the phosphonate-containing polymeric viscosity reducer for drilling fluid provided in the present invention exhibits outstanding viscosity reducing effect and filter loss reducing effect after aging for 16 h at 220° C. in calcium bentonite base mud, high-density base mud, and compound brine base mud, and the effects are much better than the viscosity reducing effect and filter loss reducing effect achieved by the viscosity reducers for drilling fluid obtained from the copolymerization of 2-acrylamide-2-methyl propane sulfonic acid and acrylic acid in the Comparative Example 1 and obtained from the copolymerization of the phosphate-containing monomer expressed by formula (9), monomer B and monomer C in the Comparative Example 2. Hence, it is apparent that the phosphonate-containing polymeric viscosity reducer for drilling fluid provided in the present invention has better temperature tolerance and salt resistance performance, and is very suitable for use in well drilling in ultra deep wells and high pressure formations.

The invention claimed is:

1. A phosphonate-containing polymer, comprising structural units expressed by formula (1), structural units expressed by formula (2), and structural units expressed by formula (3) and/or structural units expressed by formula (4), wherein, a ratio of a mole number of the structural units expressed by formula (1), a mole number of the structural units expressed by formula (2), and a total mole number of the structural units expressed by formula (3) and structural units expressed by formula (4) is 10-85:10-75:5-55;

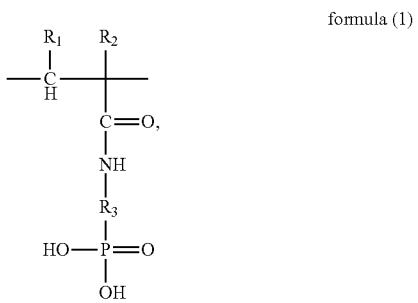

formula (1)

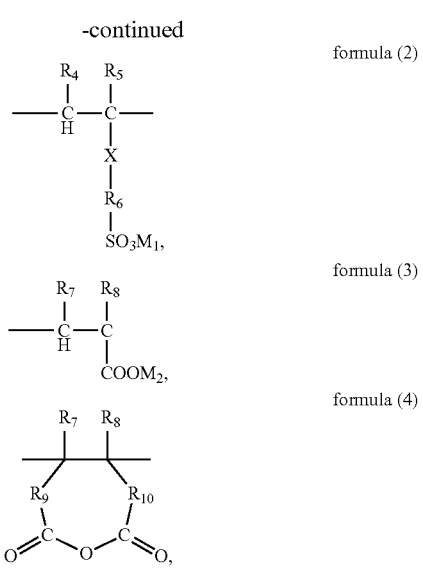

formula (2)

formula (3)

formula (4)

wherein, $R_1$ and $R_2$ are H, $R_3$ is

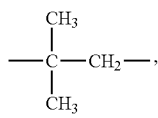

$R_7$ is H, $C_1$-$C_5$ linear or branched alkyl or —COOM$_3$, $R_8$ is H, $C_1$-$C_5$ linear or branched alkyl or —RCOOM$_4$, R is $C_1$-$C_3$ linear or branched alkylidene, $M_1$-$M_4$ are H or an alkali metal element respectively, and $R_9$ and $R_{10}$ are a bond or $C_1$-$C_3$ linear or branched alkylidene respectively, and wherein $R_4$ and $R_5$ are H, X and $R_6$ are a bond, $M_1$ is Na; or $R_4$ and $R_5$ are H, X is a bond, $R_6$ is

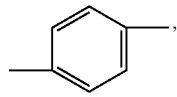

$M_1$ is Na; or $R_4$ and $R_5$ are H, X is a bond, $R_6$ is methylene, and $M_1$ is Na.

2. The phosphonate-containing polymer according to claim 1, wherein in formula (3):
$R_7$ is H, $R_8$ is H, and $M_2$ is H; or,
$R_7$ is H, $R_8$ is methyl, and $M_2$ is H; or,
$R_7$ is —COOH, $R_8$ is H, and $M_2$ is H; or,
$R_7$ is H, $R_8$ is —CH$_2$COOH, and $M_2$ is H.

3. The phosphonate-containing polymer according to claim 1, wherein in formula (4):
$R_7$ is H, $R_8$ is H, and $R_9$ and $R_{10}$ are a bond.

4. The phosphonate-containing polymer according to claim 1, wherein a number-average molecular weight of the phosphonate-containing polymer is 1,500-8,000.

5. A phosphonate-containing polymer viscosity reducer for drilling fluid prepared with the following method: homogeneously mixing an initiator, a monomer mixture, and a molecular weight regulator in an aqueous solvent and controlling them to have a polymerization reaction under olefinic solution polymerization reaction conditions, wherein the monomer mixture comprises a monomer A which is 2-acrylamide-2-methyl propanephosphoric acid, a monomer B which is one or more selected from the group consisting of sodium vinyl sulfonate, sodium p-styrene sulfonate, and sodium allyl sulfonate, and a monomer C expressed by formula (7) and/or a monomer D expressed by formula (8), and a ratio of a mole number of the monomer A, a mole number of the monomer B, and a total mole number of the monomer C and the monomer D is 10-85:10-75:5-55;

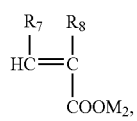 formula (7)

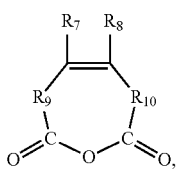 formula (8)

wherein, $R_7$ is H, $C_1$-$C_5$ linear or branched alkyl or —COOM$_3$, $R_8$ is H, $C_1$-$C_5$ linear or branched alkyl or —RCOOM$_4$, R is $C_1$-$C_3$ linear or branched alkylidene, $M_1$-$M_4$ are H or an alkali metal element respectively, and R9 and R10 are a bond or C1-C3 linear or branched alkylidene respectively.

6. The phosphonate-containing polymer viscosity reducer for drilling fluid according to claim 5, wherein the monomer C is one or more selected from the group consisting of acrylic acid, methacrylic acid, maleic acid, and itaconic acid, and the monomer D is maleic anhydride.

7. The phosphonate-containing polymer viscosity reducer for drilling fluid according to claim 5, wherein on the basis of a total weight of the monomer mixture, a dosage of the initiator is 1-8 wt. %, and a dosage of the molecular weight regulators is 0.1-4 wt. %.

8. The phosphonate-containing polymer viscosity reducer for drilling fluid according to claim 7, wherein the initiator is selected from ammonium persulfate and/or potassium persulfate, and the molecular weight regulator is thioglycollic acid and/or isopropyl alcohol.

9. The phosphonate-containing polymer viscosity reducer for drilling fluid according to claim 5, wherein the aqueous solvent is water.

10. The phosphonate-containing polymer viscosity reducer for drilling fluid according to claim 9, wherein the method for homogeneously mixing the initiator, monomer mixture, and molecular weight regulator in the aqueous solvent comprises: preparing the monomer mixture into 10-40 wt. % water solution of the monomer mixture, preparing the initiator into 5-15 wt. % water solution of the initiator, dissolving the molecular weight regulator in water and heating up the prepared water solution of the molecular weight regulator to 50-80° C., and adding the water solution of the initiator and water solution of the monomer mixture into the prepared water solution of the molecular weight regulator at a rate that ensures the temperature of the reaction system doesn't exceed 80° C.

11. The phosphonate-containing polymer viscosity reducer for drilling fluid according to claim 10, wherein, the polymerization reaction conditions ensure that a number-average molecular weight of the obtained phosphonate-containing polymer is 1,500-8,000.

12. The phosphonate-containing polymer viscosity reducer for drilling fluid according to claim 11, wherein, the polymerization reaction conditions include: reaction temperature is 85-100° C., and reaction time is 1-10 h.

13. The phosphonate-containing polymer viscosity reducer for drilling fluid according to claim 12, wherein, the method further comprises: adjusting a pH of the reaction product to 7.5-9 after the polymerization reaction is completed, and then drying and crushing the product after the pH is adjusted.

14. A viscosity reducer for drilling fluid comprising the phosphonate-containing polymer according to claim 1.

15. A method for preparing a phosphonate-containing polymer, the method comprising homogeneously mixing an initiator, a monomer mixture and a molecular weight regulator in an aqueous solvent and controlling them to have a polymerization reaction under olefinic solution polymerization reaction conditions, wherein the monomer mixture comprises a monomer A which is 2-acrylamide-2-methyl propanephosphoric acid, a monomer B which is one or more selected from the group consisting of sodium vinyl sulfonate, sodium p-styrene sulfonate, and sodium allyl sulfonate, and a monomer C expressed by formula (7) and/or a monomer D expressed by formula (8), and a ratio of a mole number of the monomer A, a mole number of the monomer B, and a total mole number of the monomer C and the monomer D is 10-85: 10-75:5-55,

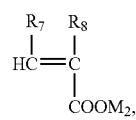

formula (7)

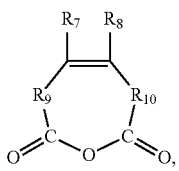

formula (8)

wherein, $R_7$ is H, $C_1$-$C_5$ linear or branched alkyl or —COOM$_3$, $R_8$ is H, $C_1$-$C_5$ linear or branched alkyl or —RCOOM$_4$, R is $C_1$-$C_3$ linear or branched alkylidene, $M_1$-$M_4$ are H or an alkali metal element respectively, and $R_9$ and $R_{10}$ are a bond or $C_1$-$C_3$ linear or branched alkylidene respectively.

16. The method for preparing a phosphonate-containing polymer according to claim 15, wherein:

(i) homogeneously mixing the initiator, monomer mixture, and molecular weight regulator in the aqueous solvent comprises: preparing the monomer mixture into 10-40 wt. % water solution of the monomer mixture, preparing the initiator into 5-15 wt. % water solution of the initiator, dissolving the molecular weight regulator in water and heating up the prepared water solution of the molecular weight regulator to 50-80° C., and adding the water solution of the initiator and water solution of the monomer mixture into the prepared water solution of the molecular weight regulator at a rate that ensures the temperature of the reaction system doesn't exceed 80° C.;

(ii) the polymerization reaction conditions include: reaction temperature is 85-100° C., and reaction time is 1-10 h; or (iii) the method further comprises: adjusting a pH of the reaction product to 7.5-9 after the polymerization reaction is completed, and then drying and crushing the product after the pH is adjusted.

* * * * *